United States Patent
Chichery

(10) Patent No.: US 9,802,380 B2
(45) Date of Patent: Oct. 31, 2017

(54) METHOD OF STICKING TOGETHER AND UN-STICKING TWO PARTS BY MEANS OF A FILLED ADHESIVE

(71) Applicant: SNECMA, Paris (FR)

(72) Inventor: Emmanuel Chichery, Guignes (FR)

(73) Assignee: SNECMA, Paris (FR)

( * ) Notice: Subject to any disclaimer, the term of this patent is extended or adjusted under 35 U.S.C. 154(b) by 1109 days.

(21) Appl. No.: 13/945,165

(22) Filed: Jul. 18, 2013

(65) Prior Publication Data

US 2014/0030108 A1    Jan. 30, 2014

(30) Foreign Application Priority Data

Jul. 26, 2012 (FR) ...................... 12 57267

(51) Int. Cl.
   *B29C 65/52*    (2006.01)
   *B32B 37/12*    (2006.01)
   (Continued)

(52) U.S. Cl.
   CPC ................. *B32B 1/04* (2013.01); *B26F 3/06* (2013.01); *C09J 5/06* (2013.01); *B29C 65/487* (2013.01); *B29C 65/489* (2013.01); *B29C 65/4855* (2013.01); *B29C 65/4875* (2013.01); *B29C 65/76* (2013.01); *B29C 66/1122* (2013.01); *B29C 66/45* (2013.01); *B29C 66/721* (2013.01); *B29C 66/7212* (2013.01); *B29C 66/7392* (2013.01); *B29C 66/7394* (2013.01); *B29C 66/742* (2013.01); *B29K 2995/0096* (2013.01); *B29L 2031/08* (2013.01); *C08K 3/10* (2013.01);
   (Continued)

(58) Field of Classification Search
   USPC ... 156/247, 306.9, 307.1, 307.3, 307.7, 701, 156/709, 711, 712
   See application file for complete search history.

(56) References Cited

U.S. PATENT DOCUMENTS 5,700,337 A * 12/1997 Jacobs ................. B29C 53/02
                                                        156/161
6,773,535 B1 * 8/2004 Wetzel ................. B29C 65/76
                                                        156/247
(Continued)

FOREIGN PATENT DOCUMENTS

WO    WO 2010/105924 A1    9/2010
WO    WO 2011/033206 A1    3/2011

OTHER PUBLICATIONS

French Preliminary Search Report dated Mar. 27, 2013 in French 12 57267 filed Jul. 26, 2012 ( with English Translation of Category of Cited Documents).

*Primary Examiner* — Sing P Chan
(74) *Attorney, Agent, or Firm* — Oblon, McClelland, Maier & Neustadt, L.L.P.

(57) ABSTRACT

A method of bonding a first part on a second part made of composite material by an adhesive, in which the adhesive is filled with elements of shape memory alloy, is provided. A method of un-sticking the first part adhesively bonded on the composite material second part is also provided. The un-sticking method includes a step of weakening the adhesive interface that consists in subjecting the adhesively bonded parts to heat treatment performed at a temperature that is lower or higher than the martensitic transformation temperature of the shape memory alloy elements.

12 Claims, 1 Drawing Sheet

(51) Int. Cl.
*B32B 38/10* (2006.01)
*B32B 43/00* (2006.01)
*C09J 5/06* (2006.01)
*B32B 1/04* (2006.01)
*B26F 3/06* (2006.01)
*C08K 3/10* (2006.01)
*B29C 65/48* (2006.01)
*B29C 65/76* (2006.01)
*B29C 65/00* (2006.01)
*B29L 31/08* (2006.01)

(52) U.S. Cl.
CPC ..... *C08L 2201/12* (2013.01); *C09J 2205/302* (2013.01); *Y10T 156/1121* (2015.01)

(56) References Cited

U.S. PATENT DOCUMENTS

| | | | |
|---|---|---|---|
| 2001/0050032 A1* | 12/2001 | Dry | C04B 22/006 106/677 |
| 2004/0026028 A1 | 2/2004 | Kirsten et al. | |
| 2006/0140772 A1* | 6/2006 | McMillan | F01D 5/147 416/241 R |
| 2009/0084983 A1 | 4/2009 | Simandl et al. | |
| 2012/0135223 A1 | 5/2012 | Alcorta et al. | |
| 2012/0183718 A1 | 7/2012 | Fabre et al. | |
| 2013/0157039 A1* | 6/2013 | Browne | B60R 13/08 428/313.9 |

* cited by examiner

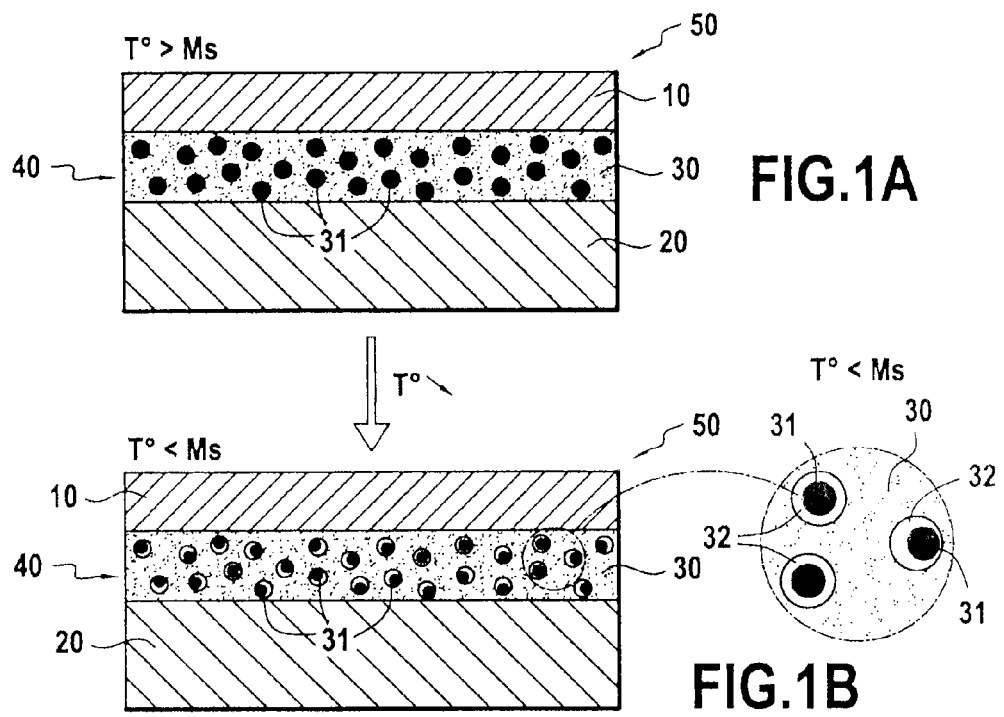
FIG.1A
FIG.1B
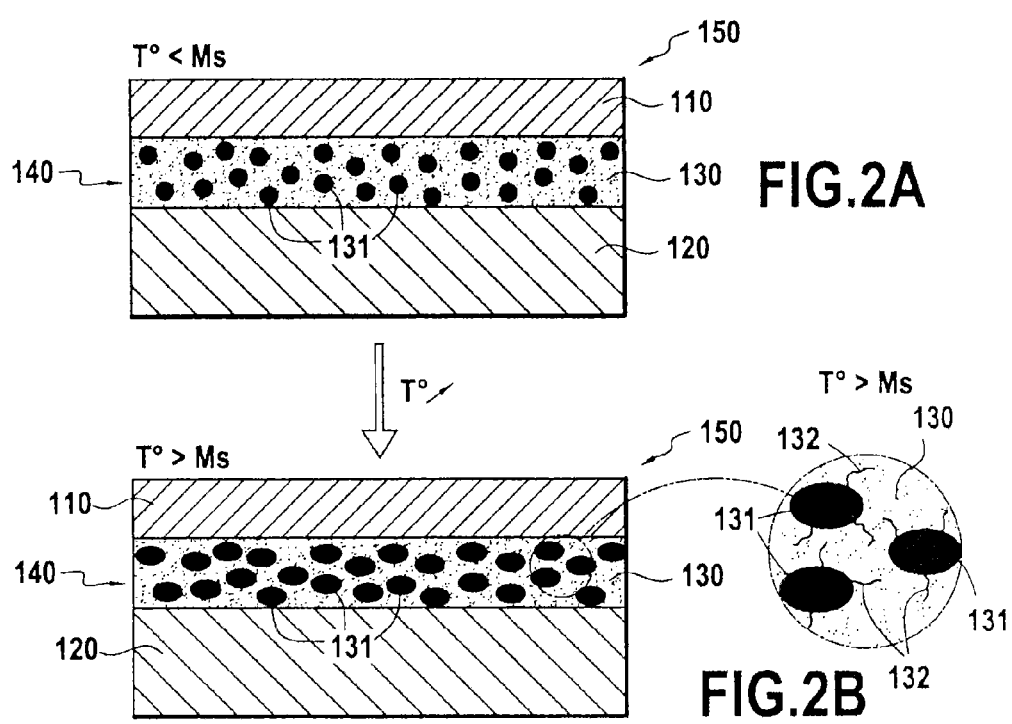
FIG.2A
FIG.2B

METHOD OF STICKING TOGETHER AND UN-STICKING TWO PARTS BY MEANS OF A FILLED ADHESIVE

BACKGROUND OF THE INVENTION

The present invention relates to the problem of non-destructively removing a part, e.g. a part made of metal or composite material, that is adhesively bonded on a part made of composite material.

The field of application of the invention relates more particularly, but not exclusively, to the portions of aeroengines that are formed by adhesively assembling together a composite material part and a part that is generally made of metal material, e.g. composite material blades having metal reinforcing elements on their leading edges, or composite material casings having metal material backing plates adhesively bonded thereto.

For fabrication or maintenance reasons, it can be necessary to be able to unstick the metal part from the composite material part. Existing solutions are as follows:

tearing away the metal part;
chemically dissolving the metal part; and
heating the adhesive joint between the parts.

Nevertheless, all of those solutions present a high risk of damaging the composite material by tearing fibers, by dissolving the matrix, or indeed by deforming the shape of the composite structure.

Consequently, there exists a need to be able to unstick a metal part that is adhesively bonded on a composite material part without running the risk of damaging the composite material.

OBJECT AND SUMMARY OF THE INVENTION

To this end, the invention provides a method of bonding a first part on a second part that is made of composite material by means of an adhesive that is filled with elements of shape memory alloy.

Thus, by filling the adhesive with elements having the properties of shape memory alloys, it is possible to form an adhesive interface that can be weakened by subjecting the assembly to heat treatment that goes past the martensitic transformation temperature of the alloy and thus causes the filler elements to contract or to expand. Local defects as generated by the change in the volume of the filler elements, e.g. pores or cracks, then make it easy to unstick the parts without damage.

In a first aspect of the bonding method of the invention, the shape memory alloy is selected from at least one of the following alloy families: Ni—Ti and Cu—Al—Be, or from other alloy families presenting properties that are similar in terms of martensitic transformation.

In a second aspect of the bonding method of the invention, the shape memory alloy elements are selected from at least one of the following elements: grains of powder, particles, wires, mesh, or net.

In a third aspect of the bonding method of the invention, the second part is made of a material selected from at least: an organic matrix composite material, a ceramic matrix composite material, and a carbon/carbon composite material.

In a fourth aspect of the bonding method of the invention, the first part is a metal part.

In a fifth aspect of the bonding method of the invention, the second part that is made of composite material corresponds to a turbine engine blade, while the first part corresponds to a part for reinforcing the leading edge of said blade.

In a sixth aspect of the bonding method of the invention, the second part that is made of composite material corresponds to a turbine engine casing, while the first part corresponds to a backing plate on said casing.

The invention also provides a method of un-sticking a first part that has been adhesively bonded on a composite material second part in accordance with the bonding method of the invention, said un-sticking method comprising at least a step of weakening the adhesive interface that consists in subjecting the adhesively bonded parts to heat treatment performed at a temperature that is lower or higher than the martensitic transformation temperature of the shape memory alloy elements.

The invention advantageously makes use of the properties of shape memory alloys in order to introduce stresses in the bonding interface, thereby weakening it by subjecting the assembly to heat treatment that is performed at a temperature that leads to a change in the crystal structure of the alloy, thereby leading to a contraction or an expansion of the mesh volume of the filler elements as a function of the nature of the shape memory alloy and serving to create pores or cracks in the adhesive interface. Once the interface has been weakened in this way, the parts can easily be unstuck without risk of damage.

In a first aspect of the un-sticking method of the invention, the method further comprises, after the step of weakening the adhesive interface, a step of creating cracks or pores in the adhesive interface comprising at least one of the following treatments:

applying a mechanical force to the first part;
heat treatment or thermal shock;
mechanical stresses by applying ultrasound.

In a second aspect of the un-sticking method of the invention, the first part is made of metal material and the method further comprises, after the step of weakening the adhesive interface, a step of generating residual stresses at the outer surface of the first part. The step of generating residual stresses is performed using treatment selected from at least: sand blasting, shot blasting, and applying laser pulses.

The invention also provides an assembly comprising at least a first part bonded to a composite material second part by means of an adhesive filled with shape memory alloy elements.

In a first aspect of the assembly of the invention, the first part is made of metal material.

In a second aspect of the assembly of the invention, the composite material second part corresponds to a turbine engine blade, while the first part corresponds to a part reinforcing the leading edge of said blade.

In a third aspect of the assembly of the invention, the composite material second part corresponds to a turbine engine casing, while the first part corresponds to a backing plate of said casing.

BRIEF DESCRIPTION OF THE DRAWING

Other characteristics and advantages of the invention appear from the following description of particular implementations of the invention given as nonlimiting examples and with reference to the accompanying drawing, in which:

FIGS. 1A and 1B are diagrammatic views showing the mechanism for weakening an adhesive interface as induced by the contraction of filler elements in an assembly comprising a part made of metal material adhesively bonded on a part made of composite material in accordance with an implementation of the invention; and FIGS. 2A and 2B are diagrammatic views showing the mechanism of weakening an adhesive interface as induced by the expansion of filler elements in an assembly comprising a part made of metal material adhesively bonded on a part made of composite material in accordance with an implementation of the invention.

DETAILED DESCRIPTION OF IMPLEMENTATIONS

The invention applies in general manner to sticking and un-sticking a first part or coating that is adhesively bonded on a second part that is made of composite material. In particular, the first part may be made of metal material or of composite material.

The term "a part made of composite material" is used to mean any part comprising fiber reinforcement densified by a matrix.

The fiber reinforcement is made from a fiber structure, itself made by weaving, assembly, knitting, etc., using fibers such as ceramic fibers, e.g. silicon carbide (SiC) fibers, carbon fibers, or even fibers made of a refractory oxide, e.g. of alumina ($Al_2O_3$). Possibly after shaping and consolidation, the fiber structure is then densified with a matrix that may in particular be an organic matrix such as a thermoplastic or thermosetting resin, thereby forming an organic matrix composite (OMC) part, a ceramic matrix, thereby forming a ceramic matrix composite (CMC) part, or indeed a carbon matrix, thereby forming a carbon/carbon (C/C) composite material part when the reinforcement is made of carbon fibers. The matrix of a composite material is obtained in conventional manner using a liquid technique, a gas technique, or a combination of those two techniques.

In certain applications, a part made of metal material, e.g. in the form of shaped metal sheet, is also adhesively bonded over all or a portion of the composite material part, as applies for example with a turboprop blade made of composite material and having its leading edge reinforced by a piece made of metal material, such as titanium.

Nevertheless, it can become necessary to be able to un-stick the metal part from the composite material part, e.g. in order to inspect or repair the composite material part. In accordance with the invention, the metal part is stuck on to the composite material part by using an adhesive, e.g. an epoxy-based adhesive, which adhesive is also filled with elements of a metal alloy possessing the properties of a shape memory alloy. The invention proposes taking advantage of the properties of shape memory alloys in order to introduce stresses into the adhesive joint and thereby weaken the adhesive interface by subjecting the assembly to heat treatment that is performed at a temperature below or above the martensitic transformation temperature of the alloy. Passing through the martensitic transformation temperature leads to a change in the crystal structure of the alloy causing a contraction or an expansion of the mesh volume of the filler elements, depending on the nature of the shape memory alloy.

The filler elements may be incorporated in the adhesive in various forms, e.g. such as grains of powder, wires, particles, or a mesh.

In accordance with a first implementation of the invention, FIGS. 1A and 1B show the weakening of an adhesive interface by contraction of the filler elements present in the adhesive joint in order to enable a metal material part to be unstuck easily from a composite material part.

As shown in FIG. 1A, an assembly 50 is made comprising a first part 10, a part made of metal material in this example, and a second part 20 that is made of composite material, the parts being assembled together by means of an adhesive 30, e.g. an epoxy-based adhesive, which adhesive is also filled with elements 31 made up of $Ti_xNi_y$ powder of composition, i.e. of Ti to Ni ratio, that is adjusted to obtain a martensitic transformation temperature lower than −60° C., thus forming an adhesive interface 40 between the parts 10 and 20. The quantity of $Ti_xNi_y$ powder that is mixed with the adhesive is also adjusted as a function of the desired un-sticking effect.

During removal of the metal part 10, the assembly 50 is subjected to heat treatment, which in this example consists in cooling the assembly to a temperature lower than the transformation temperature Ms of the alloy constituting the filler elements 31.

As shown in FIG. 1B, passing below the temperature Ms causes the elements 31 to shrink and thus leads to pores 32 in the adhesive 30 around the elements 31, thereby weakening the adhesive interface 40.

In accordance with a second implementation of the invention, FIGS. 2A and 2B show the weakening of an adhesive interface by expansion of the filler elements present in the adhesive joint so as to make it easy to unstick a metal material part that is adhesively bonded on a composite material part.

As shown in FIG. 2A, an assembly 150 is made between a metal part 110 and a composite material part 120 by means of an adhesive 130, e.g. an epoxy-based adhesive, which adhesive is also filled with elements 131 constituted by a $Ti_xNi_y$ powder, thereby forming an adhesive interface 140 between the parts 110 and 120.

When removing the metal part 110, the assembly 150 is subjected to heat treatment that consists in this example in heating the assembly up to a temperature higher than the transformation temperature Ms of the alloy constituting the filler elements 131.

As shown in FIG. 2B, passing above the temperature Ms causes the elements 131 to expand. This expansion leads to the stresses in the adhesive 130, thereby causing cracks 132 to appear in the adhesive around the elements 131, thereby weakening the adhesive interface 140.

Thus, whether by contracting or by expanding, the filler elements serve to weaken the adhesive interface and make it easier to unstick the parts of the assembly without damaging them.

In general manner, filler elements are selected to have a shape and a density that makes it possible to form pores or cracks in the adhesive interface that are close enough together to enable the local defects that appear when an un-sticking force is applied to propagate and join together, thereby leading to the part becoming unstuck over the entire adhesive interface. The type of un-sticking force that is applied after the contraction or the expansion of the filler elements may be of various kinds and depends mainly on the force that needs to be applied in order to achieve effective un-sticking, i.e. total rupture of the adhesive interface.

For example, with an adhesive interface that is already thoroughly weakened and in order to enable local defects (pores or cracks) to propagate within the adhesive interface, it is possible to apply on the metal part specifically:

a mechanical force in traction or in shear and by means of a tool;

heat treatment or thermal shock leading to differential expansion of the metal part relative to the composite material part; and/or mechanical stresses by applying ultrasound serving in particular to cause cracks to propagate in the adhesive interface.

If the contraction or the expansion of the filler elements does not make it easy to achieve un-sticking, then it is possible to perform an additional step of generating residual stresses at the surface of the metal part. When the first part is made of metal material, this step may be performed in particular by sand blasting or shot blasting the outside surface of the part bonded onto the part made of composite material. Residual stresses may also be generated at the surface of the metal part by means of a laser impact.

The filler elements may in particular be made from an alloy belonging to one of the following alloy families: nickel-titanium (Ni—Ti), and copper-aluminum-beryllium (Cu—Al—Be).

In general manner, the metal alloy constituting the filler elements should be selected as a function of its martensitic transformation temperature, which must be lower than the utilization temperature of the assembly so as to avoid weakening the adhesive interface while the assembly is in use.

The martensitic transformation temperature of the material of the filler elements is also preferably compatible with the adhesive, in particular by being lower than its curing temperature so that the transformation of the filler elements (i.e. their variation in volume) does not occur while the adhesive is polymerizing.

Furthermore, the martensitic transformation temperature of the material of the filler elements is preferably lower than the glass transition temperature of the adhesive so that, in the event of the assembly being heated in order to expand the filler elements, the adhesive does not enter into its rubbery domain, which could prevent the appearance of cracks around the filler elements.

Finally, the metal alloy used for making the filler elements of the adhesive preferably presents a maximum utilization temperature that is greater than or equal to that of the adhesive.

By way of example, alloy forming part of the Ni—Ti family present a martensitic temperature lying in the range −200° C. to 100° C. (as a function of the proportions of Ni and of Ti present in the alloy) and a maximum utilization temperature of about 300° C. Alloys of the Cu—Al—Be family present a martensitic transformation temperature lying in the range −200° C. to 100° C. (as a function of the proportions of Cu, Al, and Be present in the alloy) and a maximum utilization temperature of about 250° C.

The method of the invention thus makes it possible to weaken and break the adhesive interface between the two parts, thereby enabling a first part to be unstuck in full or in part, e.g. a part made of metal or composite material and adhesively bonded on a second part made of composite material, but without damaging at least the second part made of composite material.

What is claimed is:

1. A method of un-sticking a first part adhesively bonded on a composite material second part comprising:

bonding the first part on the second part made of composite material by an adhesive layer, wherein said adhesive layer is filled with elements of shape memory alloy dispersed in said adhesive layer; and weakening an adhesive interface by subjecting the adhesively bonded parts to heat treatment performed at a temperature that is lower or higher than a martensitic transformation temperature of the shape memory alloy elements.

2. A method according to claim 1, wherein the shape memory alloy is selected from at least one of the following alloy families: Ni—Ti and Cu—Al—Be.

3. A method according to claim 1, wherein the shape memory alloy elements are selected from at least one of the following elements: grains of powder, particles, wires, mesh.

4. A method according to claim 1, wherein the second part is made of a material selected from at least: an organic matrix composite material, a ceramic matrix composite material, and a carbon/carbon composite material.

5. A method according to claim 1, wherein the first part is a metal part.

6. A method according to claim 5, wherein the second part made of composite material corresponds to a turbine engine blade and wherein the first part corresponds to a part for reinforcing the leading edge of said blade.

7. A method according to claim 5, wherein the composite material part corresponds to a turbine engine casing, and wherein the first part corresponds to a backing plate on said casing.

8. A method according to claim 1, further comprising, after the step of weakening the adhesive interface, a step of creating cracks or pores in the adhesive interface by a weakening step that comprises at least one of the following treatments:

applying a mechanical force to the first part;

heat treatment or thermal shock; or mechanical stresses by applying ultrasound.

9. A method according to claim 1, wherein the first part is made of metal material and wherein the method further comprises, after the step of weakening the adhesive interface, a step of generating residual stresses at the outer surface of the first part.

10. A method according to claim 9, wherein the step of generating residual stresses is performed using treatment selected from at least: sand blasting, shot blasting, and applying laser pulses.

11. A method according to claim 1, wherein the heat treatment is performed at a temperature that is lower than martensitic transformation temperature of the shape memory alloy such that the shape memory alloy elements shrink thereby forming pores in the adhesive layer around the shape memory alloy elements.

12. A method according to claim 1, wherein the heat treatment is performed at a temperature that is higher than martensitic transformation temperature of the shape memory alloy such that the shape memory alloy elements expand thereby forming cracks in the adhesive layer around the shape memory alloy elements.

* * * * *